Feb. 5, 1963

R. L. PITCHFORD 3,076,276

SLIDE VIEWER

Filed July 3, 1961

INVENTOR.
RICHARD L. PITCHFORD
BY Frank C. Parker
David E. Dougherty
ATTORNEYS

Feb. 5, 1963 R. L. PITCHFORD 3,076,276
SLIDE VIEWER
Filed July 3, 1961 2 Sheets-Sheet 2
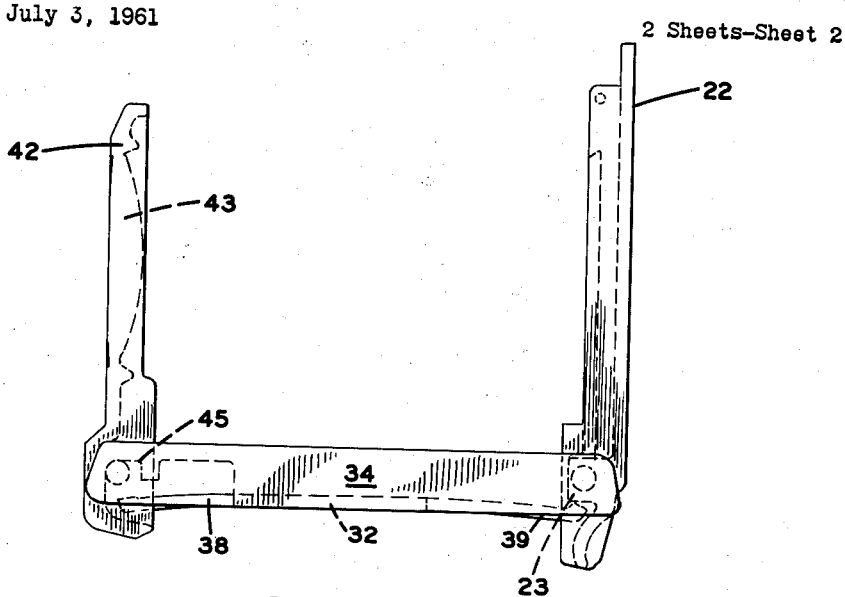
FIG. 4
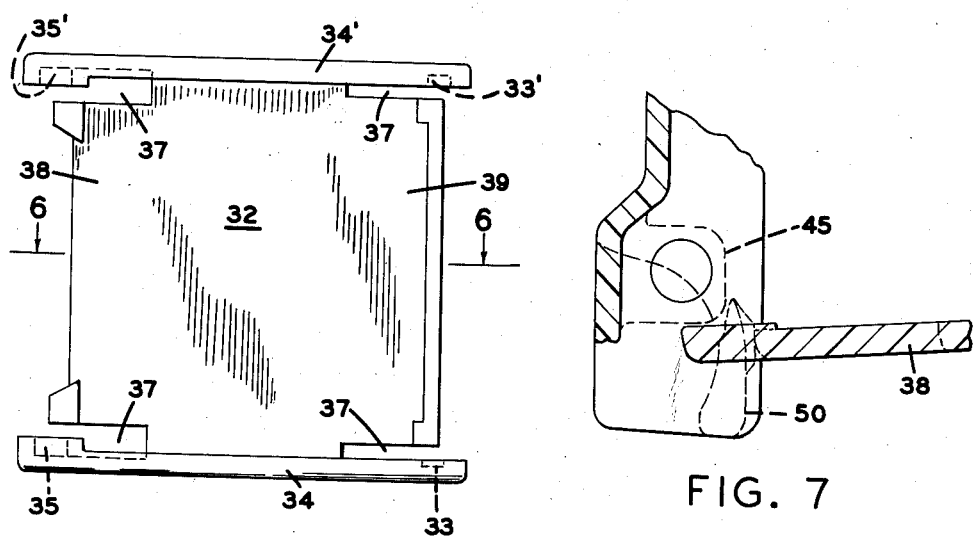
FIG. 5
FIG. 7
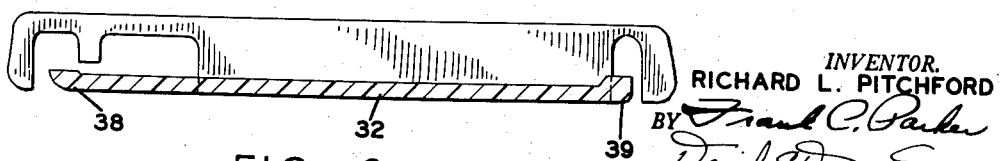
FIG. 6
INVENTOR.
RICHARD L. PITCHFORD
BY
ATTORNEYS United States Patent Office 3,076,276
Patented Feb. 5, 1963

3,076,276
SLIDE VIEWER
Richard L. Pitchford, Brockport, N.Y., assignor to Bausch & Lomb Incorporated, Rochester, N.Y., a corporation of New York
Filed July 3, 1961, Ser. No. 121,398
8 Claims. (Cl. 40—106.1)

This invention relates to a novel slide viewer and more particularly to a novel slide viewer which may be folded to a relatively small size.

Foldable hand-held slide viewers for photographic slides, particularly color slides, are in wide use. Some of these devices have been molded of thermoplastic material, economically manufactured and sold at a relatively low cost. In order to produce inexpensive devices of this type, there is a trend to sacrifice advantageous features in order to meet the demands of a competitive market.

A slide viewer, according to the present invention, includes several advantageous features, and yet may be manufactured at a relatively inexpensive cost. These features contribute substantially to the desirability of the product, however, the increase in cost of such a device, including these features, is from a practical viewpoint, negligible. Accordingly, a highly desirable slide viewer may be produced at a competitive price.

The slide viewer disclosed herein incorporates a sliding hinge assembly. The sliding hinge assembly facilitates opening the slide viewer and positioning a lens so that its focal length is equal to the distance between the lens and a slide. On closing the device, the hinge assembly is automatically returned to a ready position for facilitating a subsequent opening of the device. The arrangement also facilitates opening or closing the slide viewer with one hand.

Advantageously, a slide viewer according to the preferred embodiment of the invention incorporates an integral spring formed by a portion of a base member. This novel arrangement tends to urge a partially opened viewer into a fully open position and holds it in the open position. The use of molded thermoplastic construction facilitates forming an integral spring as a part of the base member.

A further advantage resides in a hinge structure incorporated in the preferred embodiment of the invention. This hinge structure facilitates molding and assembly procedures. Accordingly, the device may be formed in three parts; that is, a base having an integral spring therein, a slide holder and a lens holder. The lens holder may include an integrally molded lens. The use of this particular hinge arrangement allows for a relatively simple mold to be used for molding the device. These advantages result in substantial savings in manufacturing and assembly costs which may be passed on to a purchaser.

A further advantage resides in the design of the slide viewer. The novel design allows the viewer to be closed while a slide remains therein. This provision does not appreciably affect the thickness of the folded viewer which is relatively thin.

Briefly, a folded slide viewer according to the invention comprises a base and means for supporting a slide in an erect position at one end of the base. A lens is supported at the opposite end of the base in a plane generally parallel to the slide whereby the slide may be viewed through the lens. Pivotal mounting means connect the slide supporting member and the lens support to the base. The mounting means allow for rotational movement of the respective elements. The elements rotate between a generally erect parallel or facing arrangement and a folded flat arrangement wherein the slide holder, base, and lens are in a parallel stacked arrangement. The pivotal mounting means between the base and one support includes a pair of sliding pins. The sliding pins are arranged for movement along a pair of guideways in a direction parallel to the base, whereby the sliding movement of the pins facilitates the opening of the device. The sliding pins also position the slide and the lens at a predetermined distance from each other.

The invention will now be described in more detail in connection with the accompanying drawings, in which:

FIG. 4 is a side elevational view of the slide holder shown in FIGS. 1-3 in an open position;

FIG. 5 is a top plan view of the base of the slide viewer shown in FIGS. 1-4;

FIG. 6 is a cross-sectional view of the base, shown in FIG. 5 and taken along the lines 6—6 of FIG. 5; and FIG. 7 is a fragmentary view of the lens support illustrating the integral spring assembly.

Figure 1:
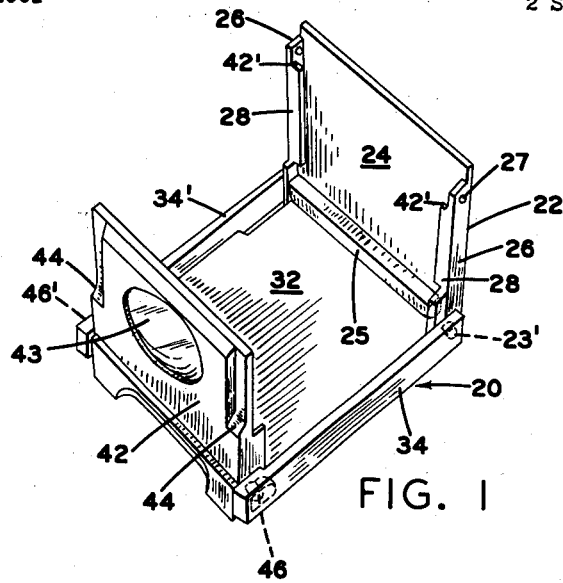
FIG. 1 is a perspective view of a slide viewer according to the invention.
Figure 2:
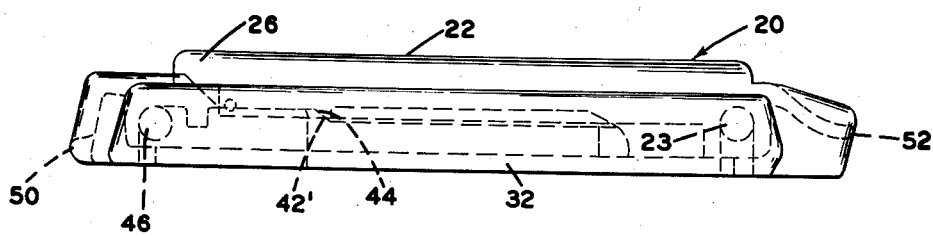
FIG. 2 is a side elevational view of the slide viewer shown in FIG. 1 but in a closed position.
Figure 3:
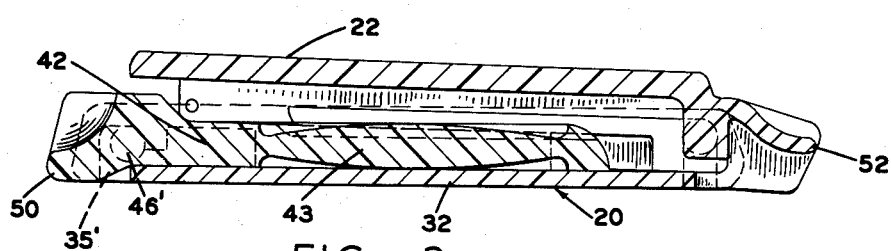
FIG. 3 is a midsectional view of the slide viewer shown in FIGS. 1 and 2 but in a partly open position.

Referring now, more particularly to the drawings, a slide viewer 20 according to the invention comprises a slide holder 22, a base 32 and a lens support 42. These parts are preferably molded of thermoplastic material; however, other materials may be used without departing from the scope of the invention.

The slide holder 22 is arranged in a vertical or erect position for viewing purposes. The slide holder 22 has a generally flat translucent rectangular shaped wall 24 and a pair of perpendicular flanges 26. The flanges 26 extend along the lateral edges of the flat wall 24 and forms a pair of vertical side walls when the slide holder 22 is in an erect position and the base 32 lies in a horizontal plane.

The flanges 26 are provided at their rear edges with right angular inwardly directed flanges 28. The inwardly directed flanges 28 also extend in a vertical plane when the slide holder 22 is in a vertical position. The upper ends of the flanges 26 and 28 are open, as indicated in the drawings, to facilitate entry of a slide into the channels defined thereby. The channels are defined by the flanges 26 and 28 in conjunction with the flat wall 24, are relatively flat, and are adapted for receiving the slide. At the bottom edge of the rectangular wall 24, there is a seat 25, formed by a projecting portion.

The flat wall 24, which is normally molded of plastic, forms a light diffusing screen. The slide is positioned against the wall 24 by means of the flanges 26 and 28. The flanges 26 and 28, in conjunction with the upwardly extending projection 25, position the slide for viewing purposes.

The base 32 has a generally rectangular shape and is provided with a pair of upwardly disposed walls 34 and 34'. The walls 34 and 34' extend longitudinally along the lateral edges of the base 32 and are generally parallel to each other and perpendicular to the base 32. The walls 34 and 34' each have a pair of slots 33, 33', 35 and 35' respectively. The slots 33, 35 are formed in the side wall 34 and are arranged near the longitudinal extremities thereof, and the slots 33' and 35' are similarly arranged in the side wall 34'.

The base 32 has a pair of inwardly disposed slots 37, cut from the opposite longitudinal edges thereof. The slots 37 and the longitudinal edges of the base 32 define the integral spring portions 38 and 39.

The slide holder 22 includes a projection 23 which extends along the bottom edge of the rectangular wall 24 below the seat 25. The projection 23 has a pair of integrally molded pins 23' extending therefrom. The pins 23' project from the lateral edges of the holder 22 and fit into the slots 33 and 33'. This arrangement forms a hinge between the slide holder 22 and the base 32.

The projection 23 contacts the spring portion 39 of the base 32. Since the distance from the center of the pin 23' to the bottom of the projection 23 is greater than the distance from the center of the pin 23' to the portion 39, the projection 23 deflects the portion 39. The slots 37 are cut in the base 32 to allow for such deflection. A shoulder 52 engages the spring portion 39 when the slide holder 22 is in an upright position. This arrangement holds the slide viewer 20 in an open position.

The lens holder 42 includes an integrally molded lens 43 and a pair of wedgelike cam surfaces 44. The cam surfaces 44 are molded on the lateral edges of the holder 42. The cam surfaces 44 coact with a pair of followers 42' which are molded in the flanges 28 of the slide holder 24. A projection 45, which is generally similar to the projection 23 of the slide holder 22, is molded along a bottom edge of the holder 42 and has a pair of pins 46 and 46' extending from the ends of the projection 45.

The pins 46, 46' extend into the slots 35, 35' in the side walls 34, 34' and coact therewith to form a hinge assembly between the lens holder 42 and the base 32. The slots 35 and 35' are generally elongated along a horizontal line parallel with the base 32. This structure forms a sliding hinge arrangement. The sliding hinge arrangement facilitates opening or closing the device and positions the lens holder 42 with respect to the slide holder 22 so that the distance therebetween equals the focal length of the lens 43.

The slots 35, 35' and the slots 33, 33' are open on the bottom to facilitate molding and assembly techniques. These slots extend to the bottom of the side walls 34, 34' but do not extend through the sides of the side walls. The portions 38 and 39 of the base 32 extend beyond the slots 33, 33', 35 and 35' and form base portions which contact the projections 23 and 45 to thereby form a base member for holding the pins within the respective slots. The pins 23', 46 and 46' may be inserted in the respective slots by spreading the side walls 34, 34' at each end thereof and allowing them to resile back into their original position to thereby enclose the pins within the slots.

In operation of the device, the slide viewer is opened by forcing the sliding pins 46, 46' horizontally along the slots 35, 35' i.e. to the right as shown in the drawing (FIG. 1 or 4). The movement of the lens holder to the right causes the cam surfaces 44 to lift the followers 42' out of engagement with the side walls 34, 34'. On closing the device the cam followers 42' force the slide holder 42 to the left and a pair of nibs 27 molded on the flange 26 are forced between the side walls 34, 34' to lock the device in a closed position. The side walls 34 and 34' are partially relieved such as shown at 27' to allow the walls to receive the nibs 27 therebetween.

As the lens holder 42 is opened, it is rotated on the sliding pins 46, 46' against the right-hand portion of the slots 35 and 35'. The force moving the sliding pins to the right is exerted on a shoulder 50 which lies below the pins 46 and 46' and tends to rotate the lens holder 42 into the open position. As the lens holder 42 rotates, it forces the pins 46, 46' against the left sides of the slots 35, 35' and thereby positions the lens. Likewise, the slide holder 22 is raised by having force exerted on a portion 52 which is formed in the projection 23. This portion 52 lies below the pins 23' and thereby rotates the slide holder into the open arrangement.

What is claimed is:

1. A slide viewer comprising a base and means for supporting a slide in an erect position with respect to said base, a lens and means for supporting said lens in an erect position with respect to said base, means for connecting a lower portion of said slide supporting means to said base and means for connecting a lower portion of said lens supporting means to said base, said connecting means disposed at the opposite ends of said base for providing rotational movement between the erect position wherein said slide supporting means and said lens are generally parallel to each other and perpendicular to said base, and a relatively flat folded position wherein said slide support, said base, and said lens are in a substantially parallel stacked arrangement, said connecting means including a pair of cooperatively formed sliding pins and guideways disposed at one end of said base whereby the sliding movement of the pins facilitates the opening of the viewer and positions the slide and the lens at a predetermined distance from each other.

2. A slide viewer comprising a base and means for supporting a slide in an erect position with respect to said base, a lens and means for supporting said lens in an erect position with respect to said base, said base including an integral spring formed by a pair of inwardly extending cuts, means for connecting a lower portion of said slide supporting means and means for connecting a lower portion of said lens supporting means to said base, said connecting means disposed at the opposite ends of said base for providing rotational movement between the erect position wherein said slide supporting means and said lens are generally parallel to each other and perpendicular to said base and a relatively flat folded position wherein said slide holder, said base and said lens are in a substantially parallel stacked arrangement, said supporting means and said connecting means coacting with said spring portion to thereby hold the supporting means in the erect position, said connecting means including a pair of cooperatively formed sliding pins and guideways disposed at one end of said base whereby the sliding movement of the pins facilitates the opening of the viewer and positions the slide and the lens at a predetermined distance from each other.

3. A slide viewer comprising a base and means for supporting a slide in an erect position with respect to said base, a lens and means for supporting said lens in an erect positon with respect to said base means for connecting a lower portion of said slide supporting means to said base and means for connecting a lower portion of said lens supporting means to said base, said connecting means disposed at opposite ends of said base and adapted for providing rotational movement between an erect position wherein said slide supporting means and said lens are generally parallel to each other but perpendicular to said base and a realtively flat folded position wherein said slide holder, said base, and said lens are in a substantially parallel stacked arrangement, said connecting means disposed at one end of said base including means for defining a pair of vertical slots generally parallel to said supporting means erect position and open at the bottom thereof, said supporting means supported at the lower portion of said slot by a portion of said base, and said connecting means also including a pair of cooperatively formed sliding pins and guideways disposed at said one end of said base parallel to said stacked arrangement whereby the sliding movement of the pins along the guideway facilitates the opening of the device and positions the slide and the lens at a predetermined distance from each other.

4. A slide viewer comprising a base and means for supporting a slide in an erect position with respect to said base, a lens and means for supporting said lens in an erect position with respect to said base, said base including a pair of integral springs formed by longitudinally extending slots, means including a pair of pins located in a lower portion of said slide supporting means for connecting said slide supporting means to said base and means including a pair of pins located in a lower portion of said lens supporting means to said base, said connecting means disposed at opposite ends of said base and adapted for providing rotational movement between an erect position wherein said slide supporting means and said lens are generally parallel to each other but perpendicular to said base and a relatively flat folded position wherein said slide holder, said base, and said lens are in a substantially parallel stacked arrangement, said connecting means including means defining a pair of vertical slots disposed at one end of said base and adapted to receive one of said pair of said pins of said connecting means, said slots being generally parallel to the erect position of said supporting means and open at the bottom thereof, and said spring portion of said base forming a closure at the lower portion of said vertical slots for holding said pins therein, and said connecting means also including a pair of guideways disposed at said one end of said base generally parallel to said base and associated with one of said pair of said pins whereby the sliding movement of the pins along the guideways facilitates the opening of the device and positions the slide and the lens at a predetermined position from each other.

5. A slide viewer as set forth in claim 4 wherein said slide supporting means and said lens supporting means each include a shoulder formed substantially on the inner edge of a lower portion thereof.

6. A slide viewer as set forth in claim 4 wherein said lens supporting means includes a cam and said slide supporting means includes a cam follower adapted to force said slide supporting means upwardly toward an erect position when said lens supporting means is moved inwardly along the respective guideways.

7. A slide viewer as set forth in claim 6 wherein said slide supporting means includes a pair of nibs and said base includes a pair of upwardly disposed side walls, said side walls adapted to receive said nibs therebetween in close engagement to thereby form a force fit when said slide viewer is folded.

8. A slide viewer as set forth in claim 7 wherein said slide supporting means includes a pair of angular walls defining a pair of opposed channels and a diffusion screen adapted to receive a slide between said opposed walls and against said screen, a pair of cam followers and a pair of nibs formed on said angular walls, and said lens supporting means comprising an integrally molded lens and a pair of cam surfaces molded therein.

References Cited in the file of this patent

UNITED STATES PATENTS

| | | |
|---|---|---|
| 2,426,888 | Langberg | Sept. 2, 1947 |
| 2,943,409 | Maiershofer | July 5, 1960 |
| 2,983,061 | Maiershofer | May 9, 1961 |